G. G. HEGHINIAN.
MOLDING PRESS.
APPLICATION FILED MAR. 9, 1911. RENEWED DEC. 3, 1913.

1,128,309.

Patented Feb. 16, 1915.

2 SHEETS—SHEET 1.

WITNESSES:

INVENTOR.
G. G. Heghinian
BY
ATTORNEY.

G. G. HEGHINIAN.
MOLDING PRESS.
APPLICATION FILED MAR. 9, 1911. RENEWED DEC. 3, 1913.

1,128,309.

Patented Feb. 16, 1915.

2 SHEETS—SHEET 2.

WITNESSES:

INVENTOR.
G. G. Heghinian
BY
ATTORNEY.

United STATES PATENT OFFICE.

GARABED G. HEGHINIAN, OF NEW YORK, N. Y.

MOLDING-PRESS.

1,128,309.   Specification of Letters Patent.   Patented Feb. 16, 1915.

Application filed March 9, 1911, Serial No. 613,441. Renewed December 3, 1913. Serial No. 804,485.

*To all whom it may concern:*

Be it known that I, GARABED G. HEGHINIAN, citizen of the United States, and resident of the city of New York, borough of Brooklyn, in the county of Kings and State of New York, have invented certain new and useful Improvements in Molding-Presses, of which the following is a specification.

The object of my invention is to produce a new and improved molding press, for forming, molding and compressing blocks from plastic or semi-plastic substances, as for example an asphalt mixture, and which press is simple in construction, strong and durable, has a safety appliance to prevent undue breaking strains and operates rapidly and effectively.

Figure 1:
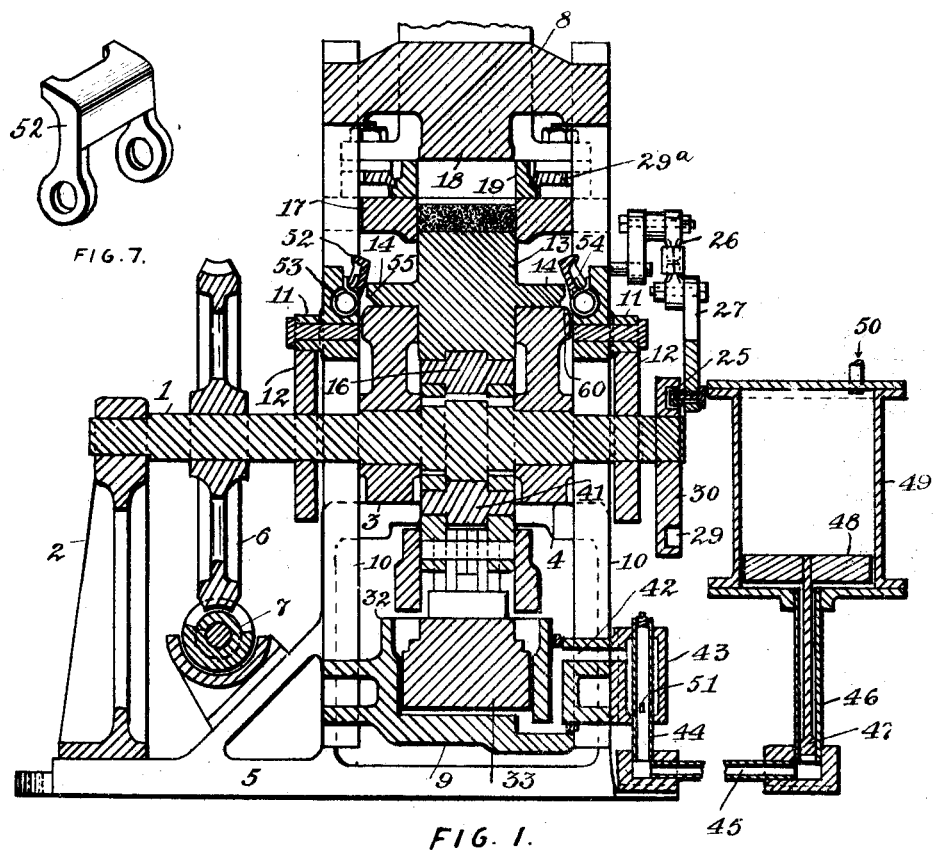
Figure 2:
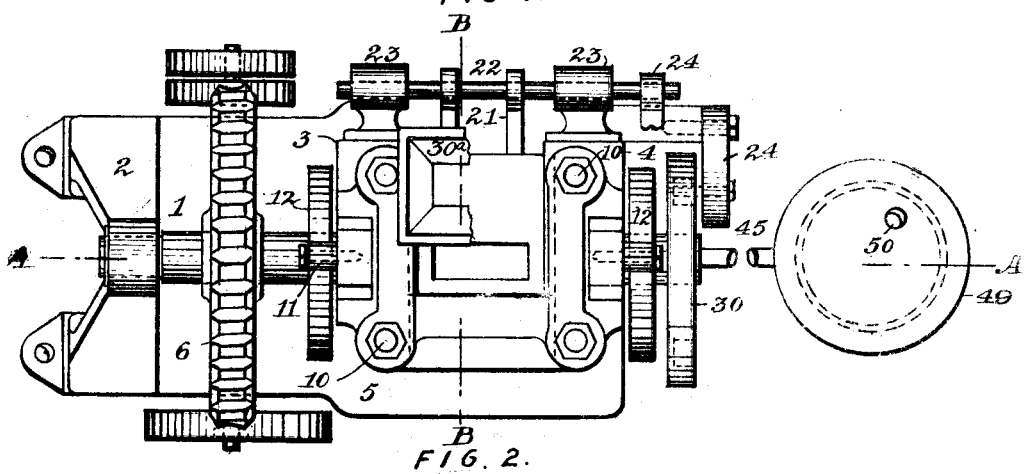
Figure 3:
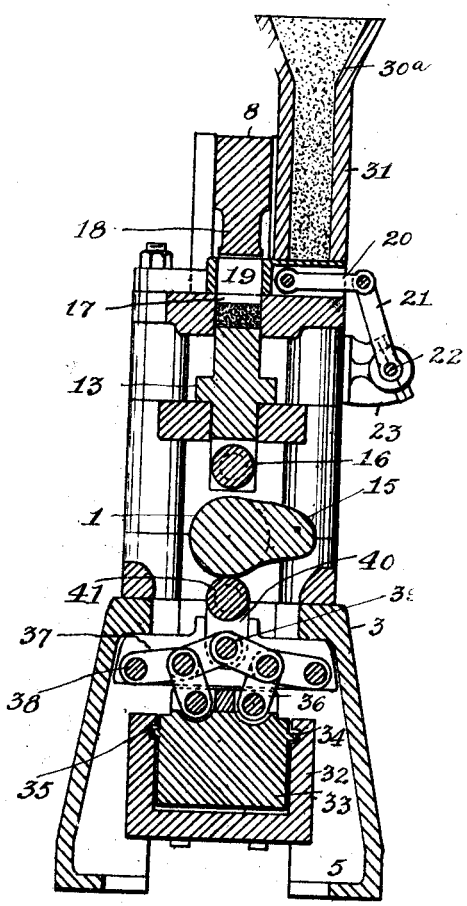
Figure 4:
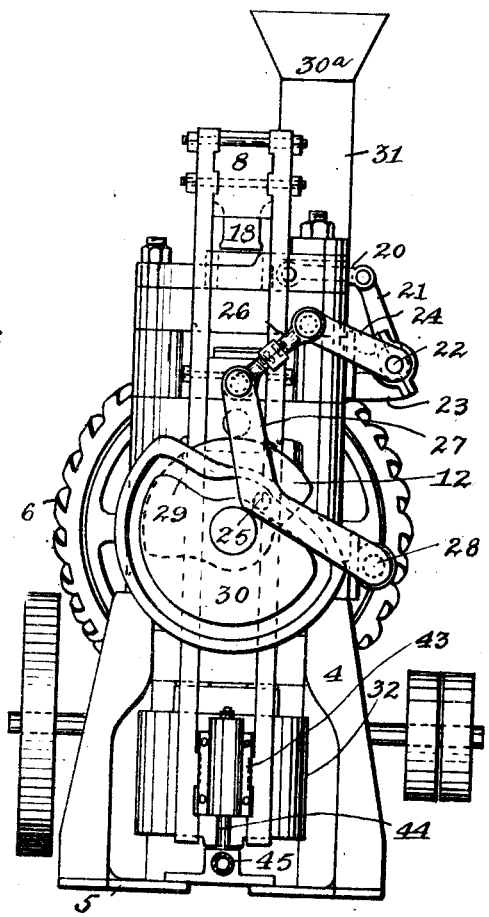
Figure 5:
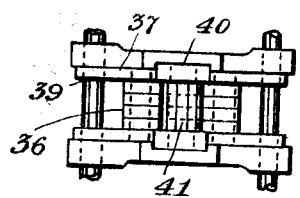
Figure 6:
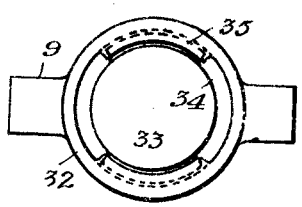

In the accompanying drawings in which like letters of reference indicate like parts in all the figures: Figure 1 is a vertical longitudinal sectional view through my improved molding press, on line A—A Fig. 2. Fig. 2 is a plan view of the same, parts being broken away. Fig. 3 is a vertical transverse sectional view through the same on the line B—B of Fig. 2. Fig. 4 is a side view. Fig. 5 is a detail plan view of the toggle lever. Fig. 6 is a plan view of the cylinder and plunger. Fig. 7 is a perspective view of one of the locking dogs.

Letters Patent No. 834,671 of the United States were issued to me on the 30th day of October, 1906, for a molding press and the machine of my present invention is an improvement of what is shown in my prior patent above referred to.

The horizontal driving shaft 1 is mounted in standards 2, 3 and 4 on a base 5 and this shaft 1 carries a worm wheel 6 engaging a worm 7 which is driven in some suitable manner from some suitable source of power. A top cross head 8 and a bottom cross head 9 are united by groups of heavy vertical bars 10 on which cam rollers 11 are mounted, one on each side of the machine, said cam rollers each running on the edge of a cam 12 secured on the shaft 1, so that as the shaft 1 revolves, the cross heads 8 and 9 are moved up and down in unison. An anvil 13 provided with side arms 14 rests by means of said arms on the standards 3 and 4 and can be forced upward by the cam 15 on the shaft 1 which cam can act on a roller 16 in the lower part of the anvil. The anvil fits into and is adapted to move upward into the die or mold 17 directly beneath and in line with the compressor head 18 formed on the lower end of the upper cross head 8. On the top of the mold 17 a box 19 is mounted to slide horizontally and is provided with an opening of the same size as the top of the anvil 13 and compressor head 18, said box being open at the top and bottom, and connected by pivoted links 20 with arms 21 of a rock shaft 22 mounted in brackets 23 on the frame of the machine, and provided with an end crank 24 which is connected by an adjustable link 26 with one end of an angle lever 27 pivoted at 28 to the frame of the machine and carrying a pin 25 which enters the cam groove 29 in the outer face of the cam disk 30 fixed on the end of the shaft 1 as shown in Figs. 1 and 4. The sliding box 19 is guided in its movements by fixed guide arms 29ª. A feed hopper 30ª is provided with a vertical outlet chute 31, the lower end of which terminates in the same place at the top of the sliding box 19 so that the sliding box 19 can pass under the lower end of this chute and the plastic or semi-plastic material can pass from this chute into the box. The lower cross head 9 contains a cylinder 32 into which is placed a plunger 33 which, of course, is provided with the usual hydraulic packings which have been omitted for clearness. This plunger is provided with lateral projections 34 which pass into the corresponding internal grooves 35 in the cylinder 32, which grooves are of such height as to give the plunger a certain up and down play in the cylinder. The top of the plunger is connected by links 36 with toggle levers 37 pivoted to the frame of the machine at 38 and pivoted at their inner ends 39 to a guided vertically movable member 40 which carries at its upper end the roller 41 upon which the cam 15 can act. The interior of the cylinder 32 communicates by the channel 42 with the interior of a chamber 43 bolted to the end of the lower cross head as shown in Fig. 4 and through the said chamber 43 a vertical pipe 44 passes, slidably, said pipe being fixed and its lower end communicating by the pipe 45 with the tube 46 containing a piston 47 of small area connected at its upper end with a larger piston 48 in an accumulator 49 into which steam, oil, or air pressure under pressure is admitted through the pipe 50. The upright fixed pipe 44 is closed at its upper end and has four openings 51 for establishing communication between the interior of the chamber 43 and the interior of the pipe 44. A U-shaped dog 52 is pivoted at 53 to the vertical bars 10 and by springs 54 surrounding the pivots of said dog, the upper free end of the dog is thrown inward and into that path of the arms 14 of the anvil 13, said arms being provided with a bevel 55 at the bottom corner of the outer end for a purpose and that will be set forth.

The operation is as follows: The empty box 19 is passed under the chute 31 of the hopper and the plastic or semi-plastic material such as asphalt filled into said box which is then moved from under the outlet chute of the hopper 30 beneath the compressor head 18 of the upper cross head 8. The anvil 13 now rests upon the upper end of the standards 3 and 4 the upper end of the anvil closing and fitting into the lower end of the mold 17. The cam 15 through the toggle levers forces down the lower cross head 9 and also the upper cross head 8, causing the compressor head 18 on the same to force the charge of asphalt from the box 19 into the mold 17 and upon the upper end of the anvil 13. Then both the cross pieces are raised under the action of the cams 12. With the parts in the position as shown in Fig. 3 the block has just been molded and is within the mold above the top of the anvil 13. By the action of the cam 29 and levers the box 19 is now rapidly withdrawn and brought beneath the chute 31 and filled with fresh material and the cam 15 now forces up the anvil which pushes the completed block up to the level of the top of the mold. As the anvil rises, the dogs 52 are first pressed outward and then snap inward and engage the bevels 55 of the arms 14 of the anvil, and thus hold the anvil in raised position, it being, of course, understood that during this time the bars 10 and their top and bottom cross heads are in extreme raised position. By the action of the cam 27 on its levers, the now filled box 19 is brought into the positions shown in Fig. 3 and pushes the completed block to the left on the top of the mold and the completed block is removed. The cam 15 now acts on the bottom roller 41 and forces the same down whereby the bars 10 and top and bottom cross heads are forced down, the cams 12 being so shaped as to permit of this, as it clearly appears from Fig. 4. The compressor head 18 on the top cross head now forces the material in the box through the box 19 and into the mold and upon the upper end of the anvil which is still raised. As the compressor head 18 descends, the dogs 52 descend with it, and come in contact with the outer sides of the standards, at the points 60 are pressed sidewise thus releasing the anvil just before it comes to a position of rest with its arms 14 on the standards 3 and the intervening charge of asphalt is now compressed in the mold between the top of the anvil 13 and the bottom of the compresser head 18, and now the cams 12 begin to act and lift up the bars 10 and the top and bottom cross heads and bring them into position shown in Fig. 1 and so on. The lower cross head moves up and down as stated and the chamber 43 slides up and down on the tube 44. As long as the resistance is normal no action of the plunger in the cylinder chamber 32 takes place, but if some uncommon resistance is presented within the mold, for instance, the resistance being so great that it might break the parts, then this greater strain is taken up by the plunger which gives slightly under the increased pressure, thereby forcing the piston 48, more or less, in the accumulator.

Instead of a solid and rigid resistance or opposition to any solid or heavy substance in the mold, we now have an elastic or yielding resistance which permits the parts to give without breaking.

Having described my invention what I claim as new and desire to secure by Letters Patent is:—

1. In a molding press, the combination with a frame, of a mold carried by said frame, an anvil movable in the mold, a press head movable in the mold opposite the anvil, vertically movable rods connected with the press head, a cam, and means for transmitting motion from the cam to the rods and press head, which means include a yielding member secured to the lower ends of said rods and a toggle lever between said yielding member and the cam, which toggle lever is pivotally connected with the yielding member and with the frame of the machine, substantially as set forth.

2. In a molding press, the combination with a mold, a press-head above the mold, a cam, a plunger upon which the cam can act, a cylinder containing the plunger, said cylinder being connected with the press head, a chamber connected with the cylinder and movable with the same, a fixed tube entering said chamber and having an opening communicating with the chamber and a pressure accumulator connected with said tube, substantially as set forth.

3. In a molding press, the combination with a mold, of a press head above the mold, a cam, a plunger upon which the cam can act, a toggle lever interposed between the plunger and the cam, a cylinder containing the plunger, which cylinder is connected with the press head, a chamber rigidly attached to the cylinder and movable with the same, a fixed tube projecting into the chamber and having an opening establishing communication between the tube and chamber, and a pressure accumulator communicating with said tube, substantially as set forth.

Signed at New York city in the county of New York and State of New York this 21st. day of February A. D. 1911.

GARABED G. HEGHINIAN.

Witnesses:
OSCAR F. GUNZ,
M. E. McNINCH